United States Patent [19]

Heppenstiel et al.

[11] Patent Number: 4,815,861

[45] Date of Patent: Mar. 28, 1989

[54] MIXER-FEEDER VESSEL FOR PERCENTAGEWISE MIXTURE OF TWO OR MORE LIQUIDS

[75] Inventors: Gerhard Heppenstiel; Klaus Lentz, both of Berlin, Fed. Rep. of Germany

[73] Assignee: Neue Rotaprint GmbH, Berlin, Fed. Rep. of Germany

[21] Appl. No.: 837,181

[22] Filed: Mar. 7, 1986

[30] Foreign Application Priority Data

Mar. 13, 1985 [DE] Fed. Rep. of Germany ....... 3509031

[51] Int. Cl.[4] ...................... B01F 15/02; B65D 47/06; G01F 19/00

[52] U.S. Cl. ...................................... 366/130; 73/426; 141/360; 141/364; 222/501; 366/189; 366/192

[58] Field of Search ............... 366/130, 337, 340, 189, 366/192, 341; 73/426, 219, 223; 141/364, 360, 113, 339; 222/465 R, 518, 501, 465.1; 251/323, 339; 137/396, 571, 574; 220/20, 20.5, 22, 86 R; 101/364

[56] References Cited

U.S. PATENT DOCUMENTS

| | | | |
|---|---|---|---|
| 1,303,820 | 5/1919 | Lanaux | 73/219 X |
| 1,538,483 | 5/1925 | Grantham | 141/364 X |
| 1,706,334 | 3/1929 | Toch . | |
| 1,969,360 | 8/1934 | Daley | 366/340 X |
| 2,377,363 | 6/1945 | Noble et al. . | |
| 2,613,537 | 10/1952 | DiAddario | 73/426 |
| 3,145,653 | 8/1964 | Lake | 101/364 |
| 3,166,095 | 1/1965 | Gegenheimer et al. | 137/563 |
| 4,294,372 | 10/1981 | Onishi | 220/20 |
| 4,345,841 | 8/1982 | Day | 366/341 X |
| 4,351,613 | 9/1982 | Hope et al. | 366/337 |
| 4,372,467 | 2/1983 | Pritchitt | 251/323 X |

FOREIGN PATENT DOCUMENTS

| | | |
|---|---|---|
| 405995 | 11/1924 | Fed. Rep. of Germany . |
| 626196 | 2/1936 | Fed. Rep. of Germany . |
| 1971540 | 8/1967 | Fed. Rep. of Germany . |

*Primary Examiner*—Harvey C. Hornsby
*Assistant Examiner*—Scott J. Haugland
*Attorney, Agent, or Firm*—Wenderoth, Lind & Ponack

[57] ABSTRACT

A mixer-feeder vessel for the percentagewise mixing of two or more liquids, particularly for offset printing presses, enables a fluid contained in the feeder vessel to be admitted to a fluid tank. A partial volume of the mixer-feeder vessel is subdivided into a predetermined number of chambers by means of partition walls, with the chambers arranged in adjacent relationship to form a row. The partition walls protrude from one wall of the vessel by a predetermined length into the vessel. In a wall opposite the one wall of the vessel there is provided an inlet-outlet port aligned with a first chamber of the row of chambers, so that when a liquid is supplied through the inlet-outlet port, the first chamber situated under the port is first filled and subsequently the remaining chambers along the row are filled in series. The opposite wall is spaced from confronting end sections of the partition walls by another length.

19 Claims, 3 Drawing Sheets

MIXER-FEEDER VESSEL FOR PERCENTAGEWISE MIXTURE OF TWO OR MORE LIQUIDS

BACKGROUND OF THE INVENTION

The invention relates to a mixer-feeder vessel for the percentagewise mixing of two or more liquids, particularly liquids for offset printing presses, wherein the mixed fluid in the mixer-feeder vessel can be supplied therefrom to a fluid tank.

In printing processes, particularly in offset printing processes, a printing roller must be supplied with a printing ink and, in addition, with a fluid which is obtained by percentagewise mixing of two or more liquids. For example, a fluid is mixed from water and an alcohol or from water and various alcohols. The mixed liquid (fluid) which is contained in a fluid tank is transferred to the printing roller, a portion of the roller periphery of which is immersed in the fluid. Usually the mixed fluid is replenished from a feeder vessel mounted above the fluid tank, while the fluid contained in the tank is being consumed in the printing process. One of the problems encountered in such processes results from the fact that mixing the fluid from two or more liquids is a rather difficult and laborious task for an operator of a printing press.

SUMMARY OF THE INVENTION

The object of the present invention therefore is to create a mixer-feeder vessel with which a printing press operator is enabled to rapidly and safely mix the fluid from two or more liquids.

Such object is achieved by a mixer-feeder vessel of the type specified above and which is distinguished by the vessel having a partial volume subdivided into a predetermined number of chambers by means of partition walls, the chambers being arranged in adjacent relationship to form a row. The partition walls protrude from a first wall of the vessel over a predetermined length into the vessel. A second wall of the vessel opposite the first wall has therein an inlet-outlet port aligned with a first chamber so that when a liquid is supplied through the inlet-outlet port, the first chamber underneath the port and subsequently the other chambers along the row of chambers are filled in series. The second wall is spaced from confronting end portions of the partition walls by a second predetermined length.

An important advantage of the invention resides in the fact that only a short time is required for mixing the fluid from the initial liquids. As an additional advantage, the mixing operation can take place inside the mixer-feeder vessel of the invention, so that a transfer of the mixed fluid from a separate mixing vessel to the feeder vessel is not required.

The mixer-feeder vessel of the invention is constructed to advantage so that with the aid of the vessel one can in a simple fashion obtain fluid mixtures with a predetermined percentage composition by simply pouring the initial liquids into a single inlet port of the mixer-feeder vessel.

BRIEF DESCRIPTION OF THE DRAWINGS

In the following the invention will be described in more detail, with reference to the accompanying drawings, wherein.

DETAILED DESCRIPTION OF THE INVENTION

Figure 1:
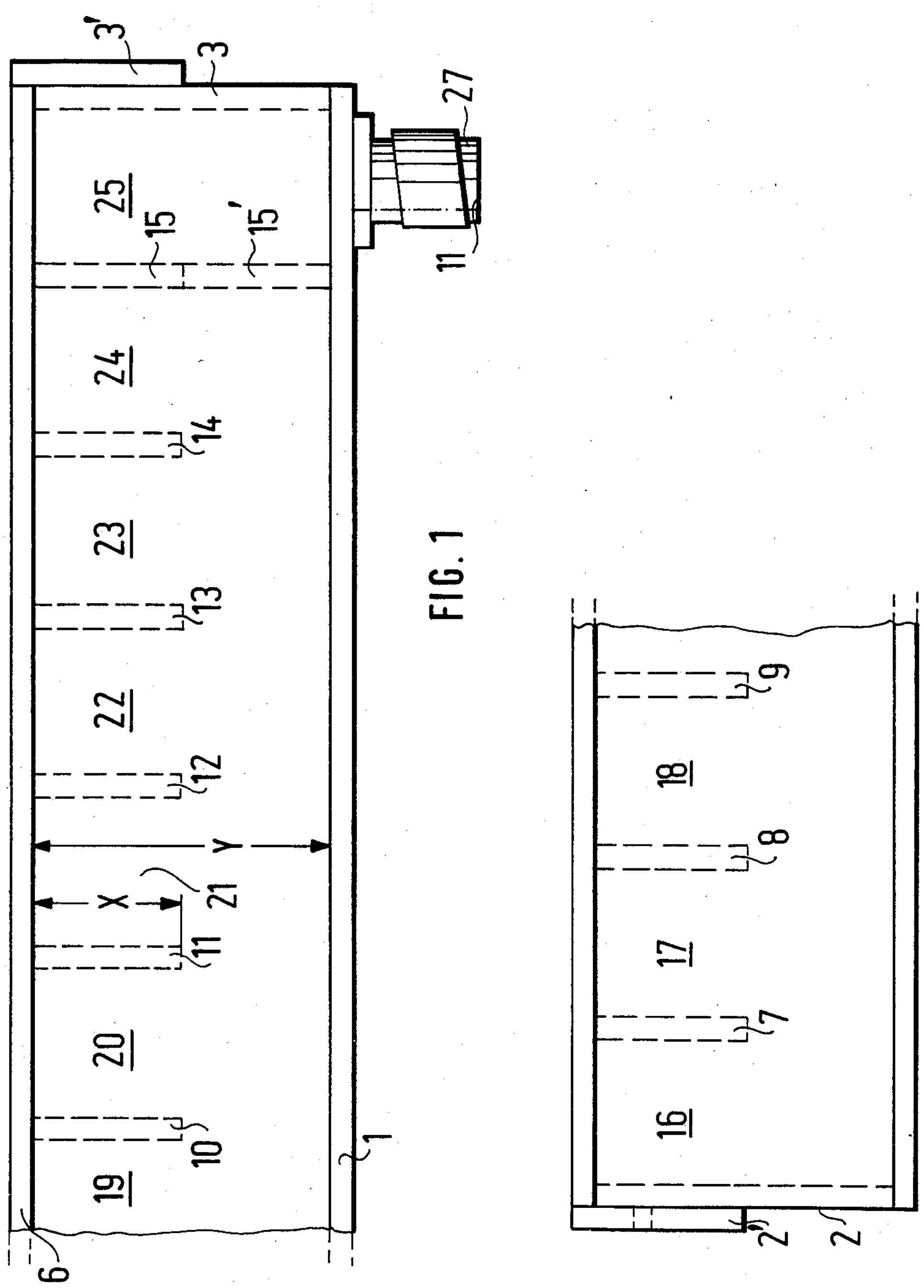
FIG. 1 is a side view of a mixer-feeder vessel according to the invention.

As illustrated in the drawings, the mixer-feeder vessel of the invention comprises a bottom wall 1, side walls 2, 3, a front wall 4, a rear wall 5, and an upper wall 6 (such terminology being with reference to the feeding orientation illustrated). The mixer-feeder vessel of the invention preferably has the shape of a rectangular box. An inlet-outlet port 11 is provided in bottom wall 1 of the vessel. As shown specifically in FIGS. 1 and 2, the mixer-feeder vessel of the invention is subdivided into individual chambers by means for measuring and mixing predetermined volumes of two or more liquids together comprising a plurality of partition walls 7–15 extending from upper wall 6 which faces port 11. The partition walls subdivide only a portion of the total volume of the vessel into individual chambers because the partition walls extend from upper wall 6 only over a certain length X toward bottom wall 1 of the vessel.

More precisely, the total volume defined by the distance Y between bottom wall 1 and upper wall 6 of the vessel is subdivided into a first partial volume defined by the distance Y-X and a second partial volume defined by distance X. The second partial volume is subdivided into other partial volumes by the individual partition walls 7–15. For the purpose of explaining the invention, length Y is assumed to be twice as long as length X. This means that when the wall thickness of partition walls 7–15 is disregarded for the sake of simplicity, the first partial volume, which is given by the distance Y-X, corresponds to one half (50%) of the total volume of the feeder vessel, and that the second partial volume also corresponds to one half (50%) of the total volume of the feeder vessel. Assuming that the individual chambers 16–25 created by partition walls 7–15 are of equal size, each of the chambers corresponds to 1/10 of the second partial volume and to $1/10 \times 50\% = 5\%$ of the total volume of the feeder vessel.

The manner in which the above-described feeder vessel is used to mix a fluid from two different liquids now will be explained. First, the feeder vessel is inverted from the position illustrated, i.e. it is placed in a mixing position with its upper wall 6 on a flat, horizontal surface. After that, a liquid I, e.g. alcohol, is supplied through inlet-outlet port 11 into chamber 25 underneath the port until the liquid in chamber 25 has reached the upper edge of partition wall 15 separating chamber 25 from chamber 24. This means that the amount of liquid I inside the feeder vessel amounts to 5% of the total volume of the vessel. When through inlet-outlet port 11 there is supplied an amount of liquid II such that the remainder of the total volume of the feeder vessel is filled, the vessel will contain 5% of liquid I and 95% of liquid II.

If 20% of liquid I and 80% of liquid II are desired to be contained in the feeder vessel, first liquid I is supplied through inlet-outlet port 11 until chamber 25 located underneath port 11 has been filled and liquid I flows over partition wall 15 into chamber 24 between partition walls 14 and 15. The filling operation is continued until chambers 22, 23, 24 and 25 have been filled with liquid I. This corresponds to a partial volume of $4\times5\%=20\%$. After that, liquid II is supplied through inlet-outlet port 11 until the entire feeder vessel has been filled. The vessel then contains 20% of liquid I and 80% of liquid II.

With such a feeder vessel, in which the partition walls have the dimensions indicated above, one can obtain fluid mixtures which comprise a maximum of 95% of liquid II and a minimum of 5% of liquid I or at least 50% of liquid II and at most 50% of liquid I. The percentage fraction of liquid I which first is supplied can be controlled in 5% steps from 5% to 50%.

Figure 2:
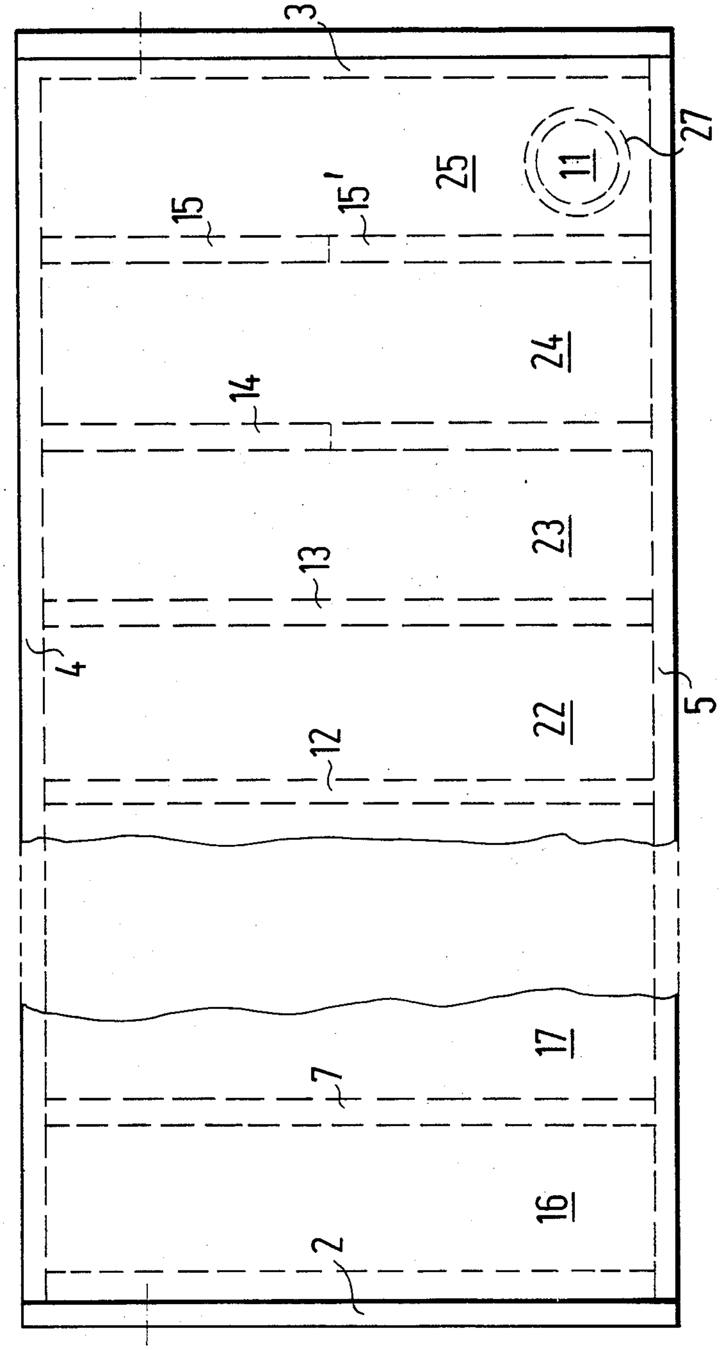
FIG. 2 is a top view of the vessel shown in FIG. 1.

In order to prevent liquid from splashing from chamber 25 under port 11 into adjacent chamber 24 during the filling operation involving port 11, a section 15' of wall 15 at the side of port 11 may extend from upper wall 6 to bottom wall 1 as illustrated in FIGS. 1 and 2.

It is readily recognized that in the feeder vessel of the invention, the partition walls forming the individual chambers can be differently configured. The only important point is that liquid I supplied through inlet-outlet port 11 fills in succession the chambers in a cascade sequence starting from the chamber situated under port 11. For example, annular chambers can be formed by partition walls arranged in a concentric configuration so that the chambers are filled in succession from the outermost annular chamber toward the innermost annular chamber of from the innermost chamber toward the outermost annular chamber.

Before the mixer-feeder vessel of the invention is inserted into a printing press, a conventional release valve 26 is attached to inlet-outlet port 11, for example by threading the valve to annular flange 27 of port 11. After that, the vessel is turned around or over so that it assumes the position shown in FIG. 3. Fastening means are provided on walls 4 and 5 of the mixer-feeder vessel to attach the vessel in a desired position to supporting plates or housing components of the printing press. Plunger 28 of release valve 26 then contacts the bottom of a fluid tank situated under the feeder vessel and is depressed inwards, whereby valve body 29 is lifted and release valve 26 is opened so that fluid can flow from the feeder vessel to the fluid tank until the fluid level in the fluid tank has reached exit opening 30 of valve 26 and the same is closed by the fluid. In this case, fluid can flow from the feeder vessel to the fluid tank only when the level of the fluid contained in the fluid tank has been lowered during the printing operation so that exit opening 30 is freed and air can enter into the feeder vessel through opening 30.

Figure 3:
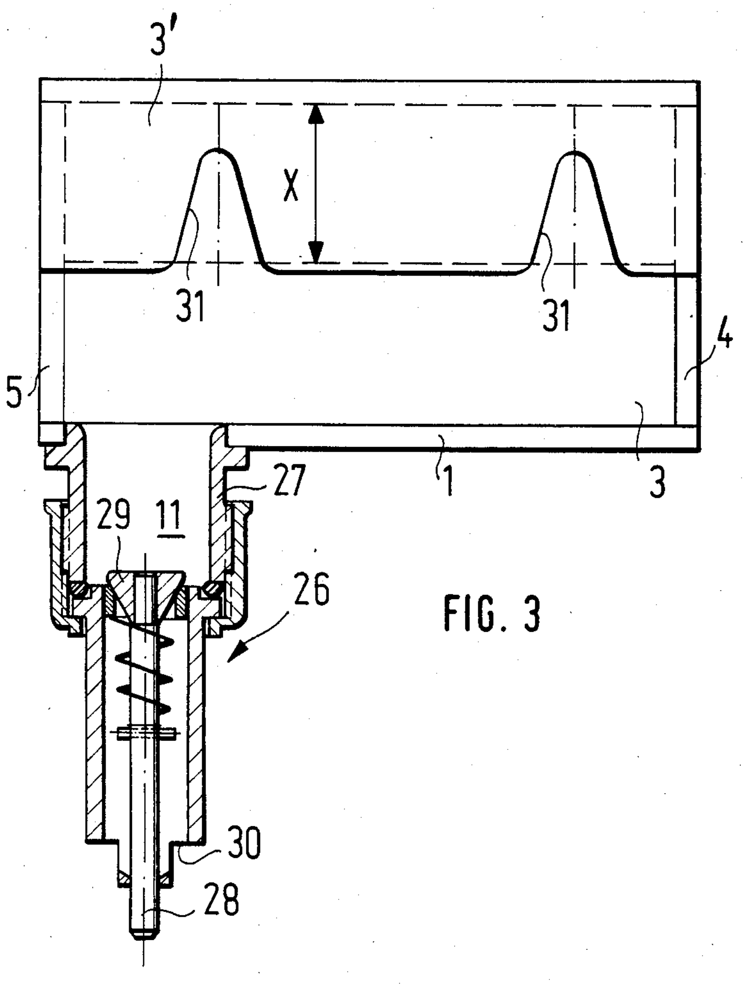
FIG. 3 is another side view of the vessel shown in FIGS. 1 and 2, with support means for mounting the vessel in a printing press and with a release valve connected to an inlet port.

The fastening means for supporting the mixer-feeder vessel include, for example, substantially V-shaped indentations 31 which are shown particularly in FIG. 3 and disposed in walls 2 and 3 of the feeder vessel. Pins (not shown), which are attached to the above-mentioned supporting plates or housing components, engage the upper edges of the indentations when the feeder vessel is in the required position above the fluid tank of the printing press. In this position, bottom wall 1 is preferably inclined so that inlet-outlet port 11 is situated at the lowermost point of the feeder vessel. Indentations 31 also can be formed by wall sections 2' and 3' which are affixed to walls 4 and 5 in the manner shown in FIG. 3.

The mixer-feeder vessel is made from a plastic material and comprises at least some transparent sections so that the liquid level in individual chambers is visible when liquid I is supplied. The entire feeder vessel preferably is made from transparent acrylic plastic.

When a plurality of liquids are to be mixed, first liquid I is supplied through inlet-outlet port 11 until a predetermined number of chambers has been filled, starting from the chamber situated underneath port 11. After that, a liquid II is supplied through inlet-outlet port 11 until another predetermined number of chambers has been filled in addition to the last chamber filled by liquid I. Once the last chamber to be filled with liquid II has been filled to its upper edge, it is guaranteed that as much liquid has moved from the chamber last filled with liquid I into the next chamber as liquid II has been supplied through port 11. After that, the remaining volume of the feeder vessel is filled with liquid III. When, for example, three chambers of a vessel configured in the manner described above have been filled with liquid I and when thereafter liquid II is filled in an amount corresponding to six chambers, the mixed fluid, after finally fully filling the vessel with a liquid III, contains 15% of liquid I, 30% of liquid II, and 55% of liquid III.

It is noted that the individual chambers and lengths X and Y of the vessel can be dimensioned in accordance with particular applications. The only important point is that the partition walls inside the vessel are arranged so that the resulting chambers are filled individually and in series, starting from the chamber situated under port 11.

We claim:

1. A mixer-feeder vessel for percentagewise mixing two or more liquids, particularly liquids for offset printing presses, and for supplying the resultant mixed fluid contained in the mixer-feeder vessel to a fluid tank, said vessel comprising:

- a partial volume of said vessel subdivided into a predetermined number of chambers by means for simultaneously measuring and mixing predetermined volumes of said two or more liquids together, said means comprising a plurality of partition walls disposed in said vessel, said chambers being arranged adjacent to each other to form a row of said chambers;
- each of said partition walls protruding from a first wall of said vessel over a first predetermined length into said vessel whereby each of said chambers defines a predetermined volume;
- a second wall of said vessel opposite said first wall having therein an inlet-outlet port aligned with a first one of said chambers in said row of chambers so that when said vessel is oriented with said first wall forming a bottom wall and a liquid is supplied into said vessel through said inlet-outlet port, said first chamber underneath said port and subsequently the other said chambers along said row are filled in series; and
- said second wall being spaced from confronting end sections of each of said partition walls by a second predetermined length.

2. A vessel as claimed in claim 1, wherein said vessel includes front and rear walls and said partition walls are parallel to each other and parallel to opposite side walls of said vessel and protrude from a bottom surface of said first wall by an amount equal to said first predetermined length, so that said chambers are disposed along the length of said vessel between said side walls and are limited by said front and rear walls of said vessel extending perpendicular to said side walls, and said inlet-outlet port is positioned above one of said chambers adjacent to one of said side walls.

3. A vessel as claimed in claim 1, wherein said vessel is made from a plastic material, at least a portion of said plastic material being transparent.

4. A vessel as claimed in claim 3, wherein said vessel is made from acrylic plastic.

5. A vessel as claimed in claim 1, wherein outside said vessel, said inlet-outlet port is surrounded by an annular flange integral with said second wall, and further comprising a feeder valve attached to said flange.

6. A vessel as claimed in claim 1, wherein the partition wall between the chamber aligned with said inlet-outlet port and the adjacent chamber is provided with a wall section as splash protection adjacent said inlet-outlet port, said wall section extending from said partition wall to said second wall.

7. A vessel as claimed in claim 1, wherein said vessel includes only one opening, said opening being disposed in said second wall and comprising said inlet-outlet port.

8. A vessel as claimed in claim 1, wherein said vessel includes means to prevent splashing of said liquids into a second one of said chambers adjacent said first chamber when said liquids are individually poured through said inlet-outlet port into said first chamber, said splashing preventing means comprising a wall section extending from a first one of said partition walls between said first chamber and said second chamber, said wall section extending to said second wall of said vessel.

9. A mixer-feeder vessel for percentagewise mixing two or more liquids used for offset printing presses, and for supplying the resultant mixed fluid contained in the mixer-feeder vessel to a fluid tank of an offset printing press, said vessel comprising:

a partial volume of said vessel subdivided into a predetermined number of chambers by means for simultaneously measuring and mixing predetermined volumes of said two or more liquids together, said means comprising a plurality of partition walls disposed in said vessel, said chambers being arranged adjacent to each other to form a row of said chambers;

each of said partition walls protruding from a first wall of said vessel over a first predetermined length into said vessel whereby each of said chambers defines a predetermined volume;

said vessel having front and rear walls and a single opening therein, said opening being in a second wall of said vessel opposite said first wall, said opening comprising an inlet-outlet port aligned with a first one of said chambers in said row of chambers so that when said vessel is oriented with said first wall forming a bottom wall and a liquid is supplied into said vessel through said inlet-outlet port, said first chamber underneath said port and subsequently the other said chambers along said row are filled in series;

said second wall being spaced from confronting end sections of each of said partition walls by a second predetermined length; and said partition walls being parallel to each other and parallel to opposite side walls of said vessel and protruding from a bottom surface of said first wall by an amount equal to siad first predetermined length, so that said chambers are disposed along the length of said vessel between said side walls and are limited by said front and rear walls of said vessel extending perpendicular to said side walls, and said inlet-outlet port is positioned above one of said chambers adjacent to one of said side walls.

10. A mixer-feeder vessel for percentagewise mixing two or more liquids used for offset printing presses, and for supplying the resultant mixed fluid contained in the mixer-feeder vessel to a fluid tank of an offset printing press, said vessel comprising:

a partial volume of said vessel subdivided into a predetermined number of chambers by means for measuring and mixing predetermined volumes of said two or more liquids together, said means comprising a plurality of partition walls disposed in said vessel, said chambers being arranged adjacent to each other to form a row of said chambers;

each of said partition walls protruding from a first wall of said vessel over a first predetermined length into said vessel whereby each of said chambers defines a predetermined volume;

said vessel having front and rear walls and a single opening therein, said vessel including a second wall opposite said first wall, said opening being in said second wall and comprising an inlet-outlet port aligned with a first one of said chambers in said row of chambers so that when said vessel is oriented with said first wall forming a bottom wall and a liquid is supplied into said vessel through said inlet-outlet port, said first chamber underneath said port and subsequently the other said chambers along said row are filled in series;

said second wall being spaced from confronting end sections of each of said partition walls by a second predetermined length;

said partition walls being parallel to each other and parallel to opposite side walls of said vessel and protruding from a bottom surface of said first wall by an amount equal to said first predetermined length, so that said chambers are disposed along the length of said vessel between said side walls and are limited by said front and rear walls of said vessel extending perpendicular to said side walls, and said inlet-outlet port is positioned above one of said chambers adjacent to one of said side walls; and said vessel includes means to prevent splashing of said liquids into a second one of said chambers adjacent said first chamber when said liquids are individually poured through said inlet-outlet port into said first chamber, said splashing preventing means comprising a wall section extending from a first one of said partition walls between said first chamber and said second chamber, said wall section extending to said second wall of said vessel.

11. A vessel as claimed in claim 1, wherein said first predetermined length is one-half the distance between said first wall and said second wall.

12. A vessel as claimed in claim 9, wherein said first predetermined length is one-half the distance between said first wall and said second wall.

13. A vessel as claimed in claim 10, wherein said first predetermined length is one-half the distance between said first wall and said second wall.

14. A vessel as claimed in claim 1, wherein said vessel includes means for supporting said vessel above a fluid tank of a printing press.

15. A vessel as claimed in claim 14, wherein said supporting means comprises V-shaped indentations.

16. A vessel as claimed in claim 9, wherein said vessel includes means for supporting said vessel above a fluid tank of a printing press.

17. A vessel as claimed in claim 16, wherein said supporting means comprises V-shaped indentations.

18. A vessel as claimed in claim 10, wherein said vessel includes means for supporting said vessel above a fluid tank of a printing press.

19. A vessel as claimed in claim 18, wherein said supporting means comprises V-shaped indentations.

* * * * *